H. H. SIMPSON.
LINE JOINT TESTER.
APPLICATION FILED OCT. 24, 1910.
1,007,741.
Patented Nov. 7, 1911.
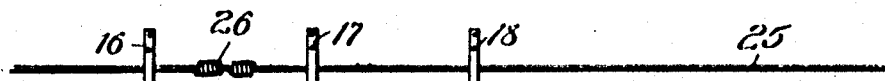
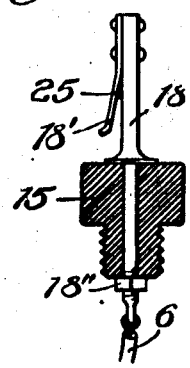
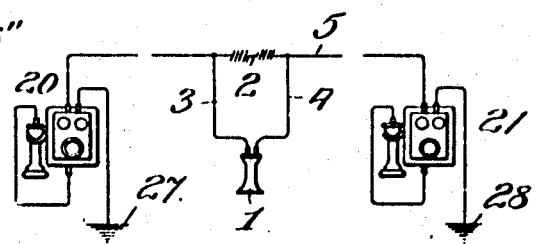
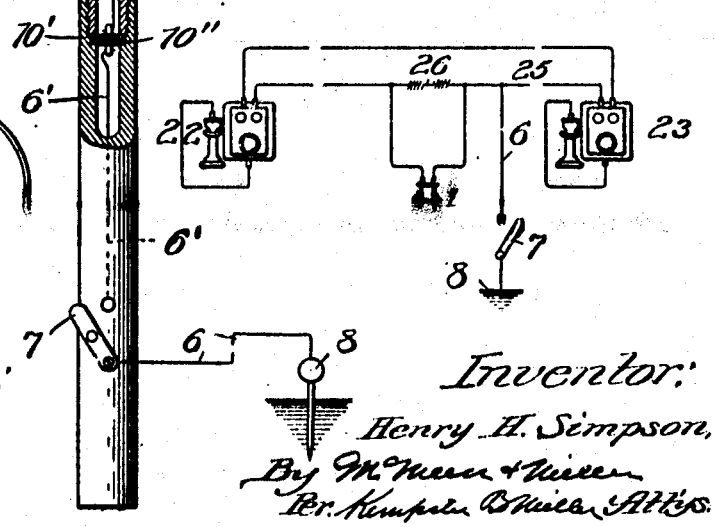
Witnesses:
Inventor:
Henry H. Simpson,

UNITED STATES PATENT OFFICE.

HENRY HARRISON SIMPSON, OF PILOT GROVE, MISSOURI.

LINE-JOINT TESTER.

1,007,741.   Specification of Letters Patent.   Patented Nov. 7, 1911.

Application filed October 24, 1910. Serial No. 588,622.

*To all whom it may concern:*

Be it known that I, HENRY HARRISON SIMPSON, a citizen of the United States of America, and a resident of Pilot Grove, Cooper county, and State of Missouri, have invented a new and useful Improvement in Line-Joint Testers, of which the following is a specification.

My invention pertains to testing apparatus and relates particularly to that class of apparatus employed in ascertaining the electrical conductivity of telephone and telegraph lines and the like.

The principal object of my invention is to provide a novel and improved line tester by means of which the condition of the line or lines with respect to a standard normal condition of conductivity may be readily determined without involving any calculations or necessitating the determination in any unit of the electrical properties of the line under test.

In the design of a transmission line, whether for the electrical transmission of intelligence or for the transmission of power, a size of conductor is selected that meets the design conditions and allows of the transmission of the required amount of current with a predetermined allowable voltage drop. However, as it is impossible to obtain and erect single lengths of conductors between two relatively distant points, it is necessary to employ a number of relatively short lengths which are bonded together to form a continuous line. These bonds are in a majority of cases made by simply twisting the ends of the two adjacent lengths of conductor together. There is thus introduced into the line a series of joints that, when the line is new and the joints are well made, do not materially increase the resistance of the line as a whole, as there is a good electrical contact between the two conductors at the joint. However, the action of the elements results in coating the conductors at the joint with an oxid of the metal of which the conductor is composed, and this greatly lessens the conductivity of the joint as compared to the continuous conductor. Especially is this true in a joint that is not tightly made, *i. e.* the surface of the conductors composing the joint are not pressed upon each other with a minimum air space therebetween. It will be readily observed that the cumulative effect of a number of these loose and corroded joints in a line will result in a positive detriment to the transmission. Resistance measurements of such a line may be made, but beyond determining the fact that the section of line under test shows a total resistance in ohms above that normally to be expected from the size, character of the wire and insulation of the line, no accurate location can be made of the cause producing this effect.

In my invention I provide a suitable testing device of great simplicity by means of which the electrical conductivity of a joint or bond in the line may be accurately and quickly determined, thereby providing a means whereby the cause producing an undesirable effect in the line as a whole may be accurately located for its subsequent removal.

In the figures which accompany and form a part of this specification Figure 1 illustrates in diagram my device applied to use on a line with ground return; Fig. 2 illustrates diagrammatically my device applied to use on a metallic circuit telephone line; Fig. 3 is a view partially in section of my complete device; Fig. 4 illustrates partially in section one of the contact hooks of my device.

Referring to Figs. 1 and 2, in which like numerals designate corresponding parts throughout, I have illustrated diagrammatically the method of applying my device to the testing of joints in both a grounded and metallic transmission line.

In Fig. 1, a line wire 5 connects two telephone stations 20 and 21, the circuits being completed through the earth, as indicated. A grounded line, such as that indicated in the figure, carries not only the currents conveying speech, but it also carries foreign or earth currents and these, as is well known in the art, cause the line to become noisy. Especially is this true where the line is in the neighborhood of alternating current power distributing lines or plants. Therefore, if a telephone receiver 1 of the usual resistance be bridged by the wires 3 and 4 across a joint 2 in the line 5, a divided circuit will be formed, and if the joint 2 is of substantially equal resistance to a corresponding length of the line wire, the resistance of the line between the connections of the terminals of the receiver 1 will be substantially zero, as the length of the line, including the joint, between such connection is comparatively short. There will, therefore, be no difference of potential between the connection of the wire 3 with the line 5 and the connection of the wire 4 with the line 5, and hence no current will flow through the receiver 1. There will, therefore, be evidenced no line noise in the receiver, and the joint 2 may be considered to be substantially perfect with respect to its conductivity. It will be observed from the foregoing that as a joint loosens and corrodes and so introduces more resistance into the line, the voltage drop across the terminals of the receiver 1 will increase and the line noise will be more and more noticeable in the receiver as more and more current is flowing therethrough. We have, therefore, a way of accurately determining the condition of conductivity of the joints in a line which allows of any particular joint being tested and repaired, to the betterment of the line as a whole. An all metallic line does not lend itself to this form of test, unless the line is grounded. The grounding of one side of a metallic line causes it to become unbalanced in that it is forced to carry currents from earth as well as currents conveying speech. In my device I therefore provide a ground conductor 6 (Fig. 2), which is attached to the wire under test 25. I provide a switch 7 in the ground connection 6 by means of which the ground may be only momentarily placed on the line while the actual test is taking place, in order that the transmission of the line may not be prejudicially affected for any considerable length of time. The receiver 1 is bridged across the joint 26, as in the case of the grounded line just described, and the operation and result of the test are similar to that just described.

In Fig. 3, which illustrates one embodiment of my device, a hollow handle 10 is made in sections to facilitate its transportation. A hollow trident shaped member 11 is provided with an external screw thread upon its shank portion which engages an internal screw thread in one extremity of one of the sections of the handle 10. Each of the three prongs of the member 11 is internally screw threaded to admit the externally screw threaded plugs 12, 14 and 15. These plugs are made of any insulating material, such as hard fiber or rubber, and are provided with central axial apertures which admit the shanks of the contact hooks 16, 17 and 18, respectively. A nut 18'' (Fig. 4) engages the threaded portion of the shank of the contact hook and serves to hold it rigidly in the insulating plug as 15. The contact hooks, one of which is shown in Fig. 4, are provided with a stiff leaf spring 18', which is riveted to the free extremity of the body portion of the hook 18, as indicated. One conductor 3 of the head telephone 1 is insulated and extends through the hollow handle 10 and through one prong of the member 11 and is soldered to the contact hook 16, while the other insulated conductor 4 is carried up through the handle and through the middle prong of the member 11 and is soldered to the hook 17. These insulated conductors 3 and 4 emerge through a lateral opening from the hollow portion of the section of the handle 10, to which is attached the member 11 and are of sufficient length to allow the head telephone 1 to be worn by the operator when the hooks 16, 17 and 18 are placed in contact with a line wire 25. The insulated conductor 6'' extends up through the hollow handle 10 and through the remaining prong of the member 11 and is soldered to hook 18. The other extremity of conductor 6'' is soldered to a metallic disk 10' which is rigidly attached to the threaded extremity of the upper section of the handle 10. A corresponding disk 10'' is attached to the bottom of the threaded opening in the lower section of the handle 10, and an insulated conductor 6' is soldered thereto and extends in the hollow portion of the handle 10 to one member of the switch 7. The other member of the switch 7 is connected by means of the insulated conductor 6 to a ground spike 8. It will be observed that the handle 10 may be extended to any desired length by the addition of sections between the two illustrated; the requirements being that each section be provided with an insulated conductor extending therethrough and connected at each extremity of the section with contacts as 10' and 10'', and that the sections shall be externally screw-threaded upon one end and internally screw-threaded upon the opposite end.

In the practical application of my device, the handle is built up by screwing together the various sections necessary to obtain the required length of handle to allow the operator, while standing on the ground, to place the hooks 16, 17 and 18 in contact with the line to be tested. The head telephone 1 is adjusted to the operator's ear and the hooks 16, 17 and 18 are placed over the conductor 25 to include the joint under test 26, between the hooks 16 and 17. The operator then pulls down on the handle, thereby causing the conductor 25 to be gripped by each hook as shown at 25, Fig. 4. The head telephone 1 is in this manner bridged across the joint 26, and should the line under test be a grounded line, such as that illustrated in Fig. 1, a conclusion can readily be drawn as to whether the joint is relatively good or bad by means of the sounds in the head telephone, as previously described. However, should the line under test be a metallic line as that indicated in Fig. 2, the operator thrusts the ground spike 8 into the earth and closes the switch 7, thereby placing a ground upon the line under test through conductor 6, switch 7, conductor 6', conductor 6'' and hook 18. This causes the line to become noisy, during which time a test of the joint may be made by means of the receiver 1, as has previously been described.

While I have illustrated and described one form or embodiment of my device, it is to be understood that numerous changes in the details thereof may be made without departing from the spirit of my invention.

Having thus described my invention, what I claim as new and desire to secure by United States Letters Patent is as follows:

1. In an article of the class described, a handle, a plurality of contacts carried upon one extremity of said handle, a telephone receiver connected to a pair of said contacts, and a ground connection connected to another of said contacts, for the purpose herein described.

2. In an article of the class described, a handle a plurality of contact hooks carried upon one extremity of said handle, a telephone receiver connected to a pair of said hooks, a ground connection connected to another of said hooks and a switch in said ground connection, for the purpose herein described.

3. In an electrical line joint tester, an extensible handle, a plurality of contact hooks insulated from each other and carried upon one extremity of said handle, a telephone receiver connected to a pair of said hooks, and a ground connection connected to another of said hooks, for the purpose herein described.

4. In an electrical line joint tester, a hollow extensible handle, a hollow trident shaped member carried upon one extremity of said handle, a contact hook carried by each prong of said trident shaped member and insulated therefrom, a telephone receiver connected to a pair of said contact hooks, and a ground connection connected to the remaining one of said contact hooks, for the purpose herein described.

5. In an electrical line joint tester, a hollow sectional handle, a hollow trident shaped member carried upon one extremity of one of the sections of said handle, a contact hook carried by each of the prongs of said trident shaped member and insulated therefrom, a telephone receiver connected to a pair of said hooks through the hollow portions of said handle and said trident shaped member, a ground connection connected to the remaining hook through the hollow portions of said handle and said trident shaped member, and a switch mounted upon one of the sections of said handle and adapted to allow the continuity of said ground to be made or broken at will, for the purpose herein described.

Signed by me at Pilot Grove, Cooper county and State of Missouri, in the presence of two witnesses.

HENRY HARRISON SIMPSON

Witnesses:
 JOE. YOUNGKAMP,
 WM. L. KOENIG.